United States Patent
Wu

(10) Patent No.: US 9,612,472 B2
(45) Date of Patent: Apr. 4, 2017

(54) COLOR FILTER SUBSTRATE AND MANUFACTURING METHOD THEREFOR, AND DISPLAY DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 21 days.

(21) Appl. No.: 14/801,339

(22) Filed: Jul. 16, 2015

(65) Prior Publication Data
US 2016/0161797 A1 Jun. 9, 2016

(30) Foreign Application Priority Data

Dec. 4, 2014 (CN) .......................... 2014 1 0737568

(51) Int. Cl.
*G02F 1/1335* (2006.01)
*G02F 1/1333* (2006.01)
*G02B 5/20* (2006.01)

(52) U.S. Cl.
CPC ....... *G02F 1/133514* (2013.01); *G02B 5/201* (2013.01); *G02F 1/133512* (2013.01); *G02F 1/133528* (2013.01); *G02F 1/133553* (2013.01); *G02F 1/133509* (2013.01); *G02F 1/133555* (2013.01); *G02F 2001/133557* (2013.01)

(58) Field of Classification Search
CPC combination set(s) only.
See application file for complete search history.

(56) References Cited

U.S. PATENT DOCUMENTS

2008/0068542 A1* 3/2008 Tanaka .............. G02F 1/133512
349/113

FOREIGN PATENT DOCUMENTS

| CN | 1661430 A | 8/2005 |
|---|---|---|
| CN | 2725937 Y | 9/2005 |
| CN | 1711497 A | 12/2005 |
| CN | 104090411 A | 10/2014 |
| JP | 1152366 A | 2/1999 |
| JP | 2003330008 A | 11/2003 |

OTHER PUBLICATIONS

First Chinese Office Action, for Chinese Patent Application No. 201410737568.1, dated Sep. 28, 2016, 12 pages.

* cited by examiner

*Primary Examiner* — Wen-Ying P Chen
(74) *Attorney, Agent, or Firm* — Kinney & Lange, P.A.

(57) ABSTRACT

Embodiments of the invention disclose a color filter substrate comprising: an underlying substrate; a semi-transparent and semi-reflecting layer formed on the underlying substrate; and a black matrix and a color filter layer formed on the semi-transparent and semi-reflecting layer. The black matrix and the color filter layer are formed on a side of the semi-transparent and semi-reflecting layer opposite from the underlying substrate. Other embodiments of the invention further disclose a method for manufacturing the color filter substrate, and a display device comprising the color filter substrate.

12 Claims, 4 Drawing Sheets

COLOR FILTER SUBSTRATE AND MANUFACTURING METHOD THEREFOR, AND DISPLAY DEVICE

CROSS-REFERENCE TO RELATED APPLICATION

This application claims the benefit of Chinese Patent Application No. 201410737568.1 filed on Dec. 4, 2014 in the State Intellectual Property Office of China, whole disclosure of which is incorporated herein by reference.

BACKGROUND OF THE INVENTION

Field of the Invention

The present invention relates to technical field of display technology, and specifically to a color filter substrate and a manufacturing method therefor, and a display device.

Description of the Related Art

With a development of science and technology, various kinds of display devices appear. A mirror surface display device is a special display device, which can be widely used in commercial occasions, bathrooms and the like. When no information needs to be displayed, the mirror surface display device acts as a mirror, which could be a common dressing mirror; and when certain information needs to be displayed, the mirror surface display device acts as a normal display device.

Presently, a mirror surface display device comprises a coated glass disposed in front of a common display panel, as shown in FIG. 1. However, the coated glass is usually realized through forming a plurality of layers of silicon oxide films and metal films on a glass substrate in order to provide oxidation resistance and corrosion resistance abilities, and a structure thereof is complicated. A mirror surface display device using such a mirror surface displaying structure further needs processes such as laminating, assembling, and the like, thereby increasing production cost of the mirror surface display device.

SUMMARY OF THE INVENTION

The present invention has been made to overcome or alleviate at least one aspect of the above mentioned disadvantages.

Accordingly, it is an object of the present invention to provide a color filter substrate.

According to an exemplary embodiment, the color filter substrate comprises: an underlying substrate; a semi-transparent and semi-reflecting layer formed on the underlying substrate; and a black matrix and a color filter layer formed on the semi-transparent and semi-reflecting layer. The black matrix and the color filter layer are formed on a side of the semi-transparent and semi-reflecting layer opposite from the underlying substrate.

According to another aspect of the present invention, there is provided a method for manufacturing a color filter substrate.

In an exemplary embodiment, the method comprises steps of: forming a semi-transparent and semi-reflecting layer on an underlying substrate; and forming a black matrix and a color filter layer successively on a side of the semi-transparent and semi-reflecting layer opposite from the underlying substrate.

According to a further aspect of the present invention, there is provided a display device.

In an exemplary embodiment, the display device comprises a backlight module, a polarizer structure, an array substrate, a liquid crystal layer, and the color filter substrate described above.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
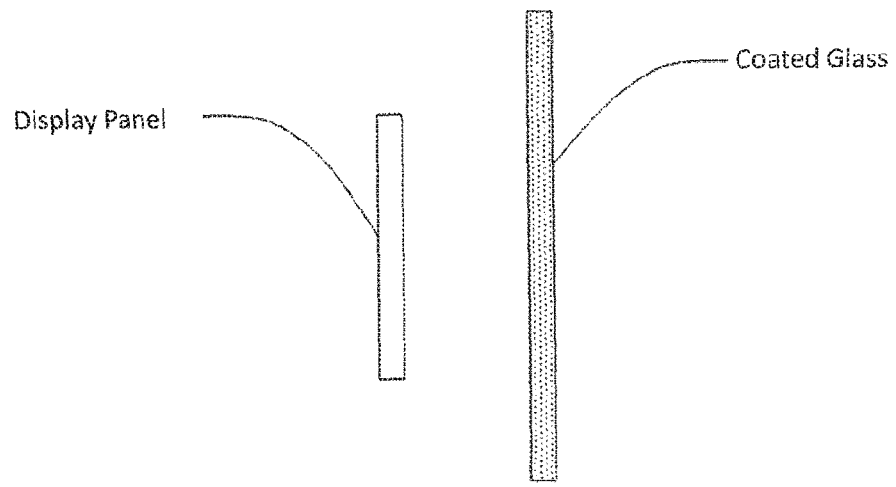
FIG. 1 is an illustrative structural drawing showing a mirror surface display device in prior arts.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Figure 2:
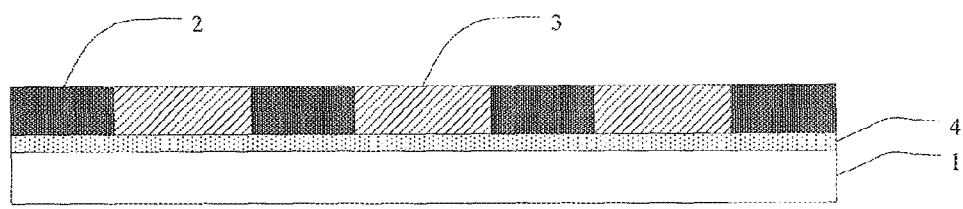
FIG. 2 is an illustrative drawing showing a color filter substrate according to an embodiment of the present invention.

FIG. 2 is an illustrative drawing showing a color filter substrate according to an embodiment of the present invention. As shown, the color filter substrate comprises: an underlying substrate 1; a semi-transparent and semi-reflecting layer 4 formed on the underlying substrate 1; and a black matrix 2 and a color filter layer 3 formed on the semi-transparent and semi-reflecting layer 4, wherein the black matrix 2 and the color filter layer 3 are formed on a side of the semi-transparent and semi-reflecting layer 4 opposite from the underlying substrate 1.

In the color filter substrate according to the embodiment of the present invention, the semi-transparent and semi-reflecting layer is disposed between the black matrix and the underlying substrate. When a display panel does not display any information, external light can be reflected by the semi-transparent and semi-reflecting layer and the black matrix, so that a display device comprising the display panel and the color filter substrate can provide a mirror surface effect. When the display panel displays certain information, internal light from the display panel can pass through the semi-transparent and semi-reflecting layer, so that display device comprising the display panel and the color filter substrate operates normally. Since a reflecting layer of a mirror surface display device is formed inside of the underlying substrate, the reflecting layer is isolated from external environment, so that better oxidation resistant and corrosion resistant effects can be provided, and thereby the reflecting layer does not need a multiple-layer design. As compared with prior arts, a structure of the reflecting layer is simple, and a production cost is relatively lower.

Figure 3:
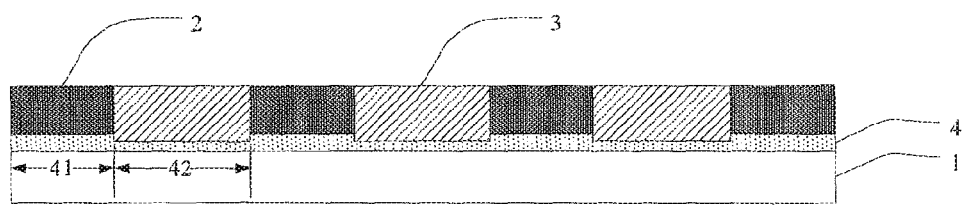
FIG. 3 is an illustrative drawing showing a color filter substrate according to another embodiment of the present invention.

Please refer to FIG. 3, which is an illustrative drawing showing a color filter substrate according to another embodiment of the present invention. As shown, the color filter substrate comprises: an underlying substrate 1; a semi-transparent and semi-reflecting layer 4 formed on the underlying substrate 1; and a black matrix 2 and a color filter layer 3 formed on the semi-transparent and semi-reflecting layer 4, wherein the black matrix 2 and the color filter layer 3 are formed on a side of the semi-transparent and semi-reflecting layer 4 opposite from the underlying substrate 1. The semi-transparent and semi-reflecting layer 4 comprises a first region 41 on which the black matrix 2 is formed and a second region 42 on which the color filter layer 3 is formed, and a light reflectivity of the first region 41 is larger than a light reflectivity of the second region 42. In the color filter substrate according to this embodiment, the light reflectivity of the region of the reflecting layer corresponding to the color filter layer is smaller than the light reflectivity of the region of the reflecting layer corresponding to the black matrix, so that internal light from the display panel can pass through portions of the reflecting layer within the region corresponding to the color filter layer more easily, thereby reducing the reflecting layer's adverse influence on display quality of the display panel.

Figure 4:
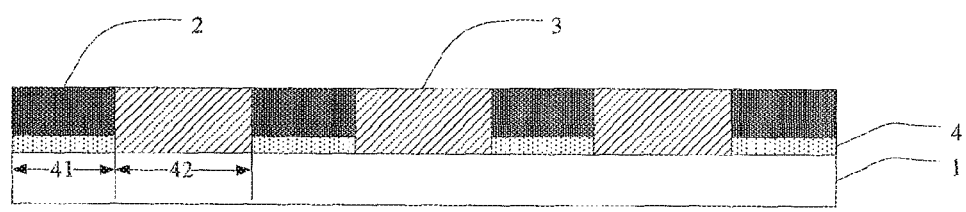
FIG. 4 is an illustrative drawing showing a color filter substrate according to a further embodiment of the present invention.
Figure 5:
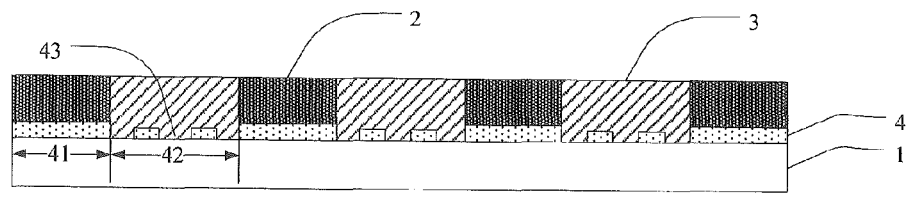
FIG. 5 is an illustrative drawing showing a color filter substrate according to a still further embodiment of the present invention.

In embodiments of the invention, various different methods may be used to make the light reflectivity of the second region corresponding to the color filter layer to be smaller than the light reflectivity of the first region corresponding to the black matrix. For example, as shown in FIG. 3, a reflective film may be used to form the semi-transparent and semi-reflecting layer, wherein light reflectivity of the reflective film decreases as a thickness thereof decreases, light transmittance of the reflective film increases as a thickness thereof decreases, and a thickness of a portion of the reflective film located in the first region is larger than a thickness of a portion of the reflective film located in the second region. Preferably, a thickness of the portion of the reflective film in the first region is in a range from 500 Å to 4000 Å, for example, the thickness may be 1000 Å, 2000 Å, 3000 Å, or the like. A thickness of the portion of the reflective film located in the second region is in a range from 0 Å to 2000 Å, for example, the thickness may be 500 Å, 1000 Å, 1500 Å, or the like. Preferably, as shown in FIG. 4, the reflective film is not formed in the second region. Preferably, as shown in FIG. 5, in order to further reduce the adverse influence on display quality of the display panel from the reflecting layer, the semi-transparent and semi-reflecting layer is formed as a perforated structure in the second region 42, so that more light can pass through and exit from the second region.

An embodiment of the invention further provides a method for manufacturing the above described color filter substrate. The method comprises the following steps of: forming a semi-transparent and semi-reflecting layer on an underlying substrate; and forming a black matrix and a color filter layer successively on a side of the semi-transparent and semi-reflecting layer opposite from the underlying substrate. In a further embodiment, the step of forming a semi-transparent and semi-reflecting layer on an underlying substrate comprises forming a reflective film on the underlying substrate, wherein light reflectivity of the reflective film decreases as a thickness thereof decreases and light transmittance increases as a thickness thereof decreases.

Moreover, after the black matrix is formed on the reflective film, the reflective film is etched to form a first region having a larger thickness and a second region having a smaller thickness, wherein the black matrix is formed on the first region. Then, the color filter layer is formed on the second region of the reflective film. As a preferable embodiment, the thickness of the first region is in a range from 500 Å to 4000 Å and the thickness of the second region is in a range from 0 Å to 2000 Å.

In an alternative embodiment, after etching the reflective film and before forming the color filter layer, a perforated structure is formed in the second region.

Specifically, a process of forming the semi-transparent and semi-reflecting layer and the black matrix comprises the following steps.

Figure 6:
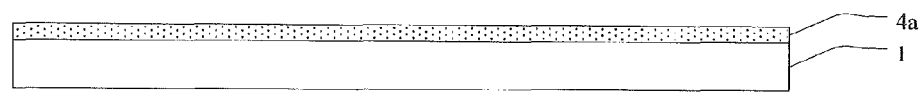
FIGS. 6-10 are illustrative drawings showing a process of manufacturing a color filter substrate according to an embodiment of the present invention.

S1: Forming a reflective film on the underlying substrate, wherein light reflectivity of the reflective film decreases as a thickness thereof decreases and light transmittance increases as a thickness thereof decreases. For example, as shown in FIG. 6, a film 4a having a relatively higher light reflectivity is formed on a glass substrate 1, Al may be used to form the film, and a thickness of the film may be in a range from 500 Å to 4000 Å.

Figure 7:
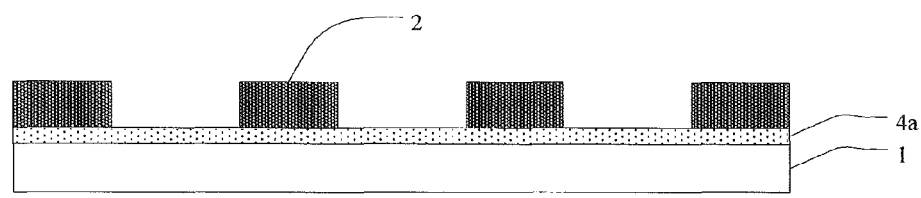

S2: Forming a black matrix on the reflective film. Specifically, as shown in FIG. 7, a material for the black matrix is deposited on the reflective film, and then the material is exposed and developed to form a pattern for the black matrix.

Figure 8:
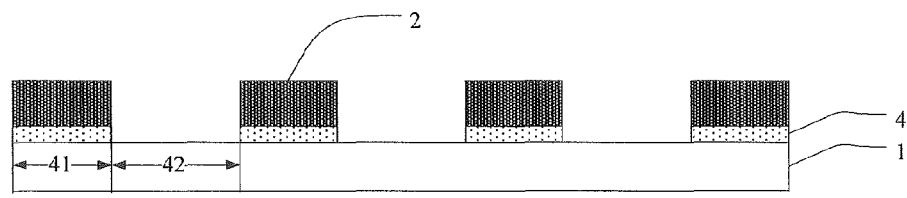
Figure 9:
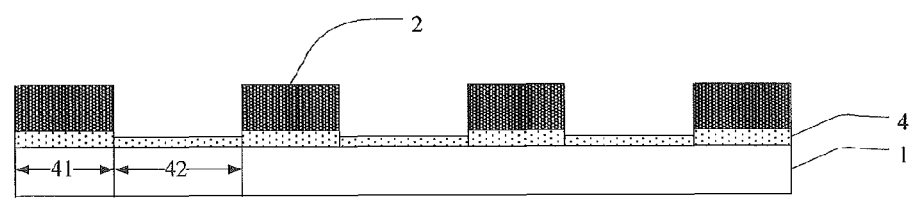

S3: Etching the reflective film such that the thickness of the second region 42 of the reflective film on which the color filter layer is to be formed is smaller than that of the first region 41 on which the black matrix is formed. Specifically, an exposed portion of the reflective film are etched off, such that a thickness of the region of the reflective film corresponding to the color filter layer is reduced to a range from 0 Å to 2000 Å. For example, as shown in FIG. 8, the exposed portion of the reflective film may be entirely etched off. At this time, the color filter layer is directly formed on the glass substrate 1. Alternatively, as shown in FIG. 9, only a part of the exposed portion of the reflective film is etched off to form the second region having a thickness smaller than that of the first region, so that the color filter layer is formed on the second region of the reflective film later on, thereby providing a semi-transparent and semi-reflecting effect.

Figure 10:
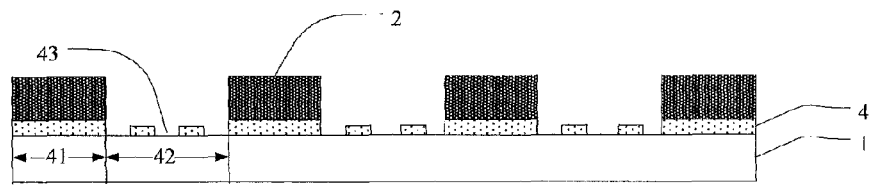

Preferably, to reduce the adverse influence on display quality of the display panel by the reflecting layer, the method further comprises the following step:

S4: after etching the reflective film and before forming the color filter layer, forming a perforated structure in the second region 42 of the reflective film. Specifically, as shown in FIG. 10, a perforated structure 43 is formed in the second region 42 of the reflective film.

After the semi-transparent and semi-reflecting layer and the black matrix being formed on the underlying substrate through the above steps, RGB material deposition and patterning processes are performed, and then the color filter substrate and an array substrate are assembled. After that, processes such as forming upper and lower electrodes, alignment layer, separating materials, and sealing glue are performed, and finally, upper and lower polarizer films and backlight module are assembled to provide the mirror surface display device.

Figure 11:
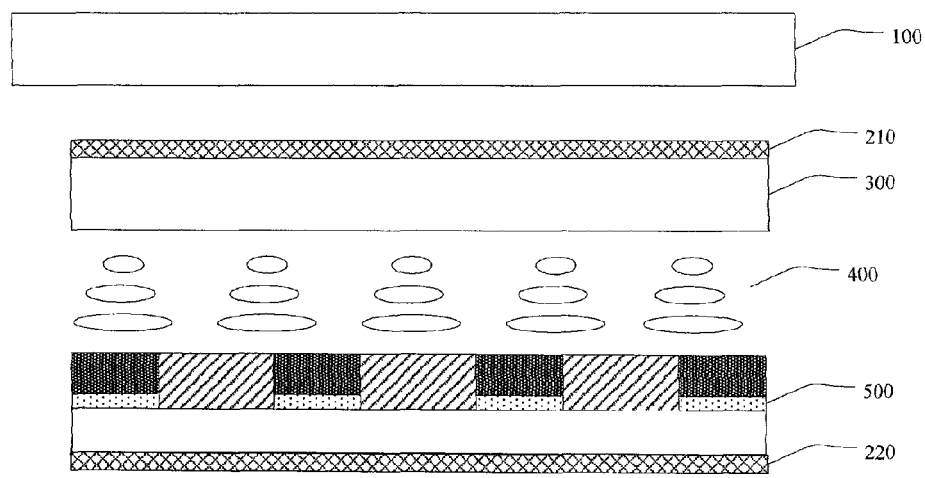
FIG. 11 is an illustrative structural drawing showing a display device according to an embodiment of the present invention.

Please refer to FIG. 11, embodiments of the present invention further provide a display device. The display device comprises a backlight module 100, a polarizer structure, an array substrate 300, a liquid crystal layer 400, and a color filter substrate 500 according to any of the above exemplary embodiments.

The polarizer structure may comprise a lower polarizer film 210 and an upper polarizer film 220 in prior arts.

Figure 12:
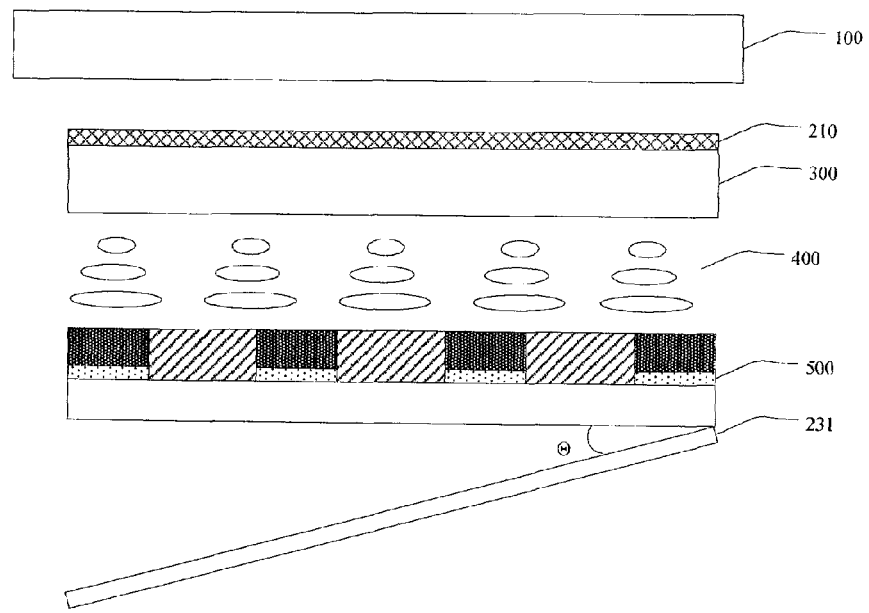
FIG. 12 is an illustrative structural drawing showing a display device according to another embodiment of the present invention.

However, polarizer films in prior arts will cause a great loss of reflected light and generate scattered light, so that mirror surface effect is reduced. Preferably, the upper polarizer film of the polarizer structure may be substituted by a transparent substrate. As shown in FIG. 12, the polarizer structure may comprise a lower polarizer film 210 located between the backlight module 100 and the array substrate 300 and a transparent substrate 231 located at a side of the liquid crystal layer 400 away from the color filter substrate 500, the transparent substrate 231 being disposed at an angle θ of 30~90 degrees with respect to the color filter substrate 500.

Figure 13:
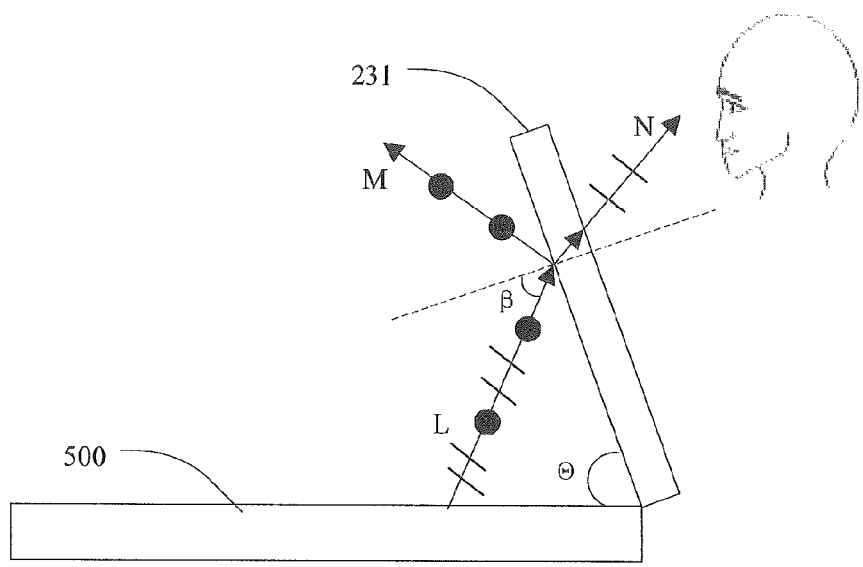
FIG. 13 is an illustrative drawing showing a displaying principle of a display device according to an embodiment of the present invention.

In the embodiments of the invention, when the transparent substrate 231 is used to displace the conventional upper polarizer film, an operating principle of such a configuration is shown in FIG. 13. Light emitted from a backlight source becomes polarized light after passing through the lower polarizer film 210, and the polarized light forms light L after passing through the liquid crystal layer 400 and the color filter substrate 500. When projected towards a surface of the transparent substrate 231 at a Brewster angle β (wherein β=arctan(n1/n2), where n1 is the refractivity of air, and n2 is the refractivity of the transparent substrate 231), the light L is resolved into reflected light M and refracted light N perpendicular with each other in their polarization directions. For the light L emitted from different regions of the color filter substrate 500, when the light L is projected towards the transparent substrate 231 at a Brewster angle β, the reflected light M and refracted light N resulted through the resolution have different energies due to different polarization directions as a function of the liquid crystal layer. For example, if the light L passing through a pixel in the color filter substrate is a light having a polarization direction in a X direction, then when the light L is projected towards the transparent substrate 231 at a Brewster angle β, energy of the reflected light M resulted through resolution is relatively weak, and energy of the refracted light N resulted through resolution is relatively strong, such that a user can see the light emitted from the pixel. However, if the light L passing through another pixel in the color filter substrate is a light having a polarization direction in a Y direction (the X direction is perpendicular to the Y direction), then when the light L is projected towards the transparent substrate 231 at a Brewster angle β, energy of the reflected light M resulted through resolution is relatively strong, and energy of the refracted light N resulted through resolution is relatively weak, such that a user cannot see the light emitted from the another pixel. With the above configuration, the transparent substrate can provide the same function as the replaced upper polarizer film, such that the display device can not only display normally, but also provide an improved mirror surface effect.

Specifically, the transparent substrate may be made from glass or acrylic materials, and a side of the transparent substrate contacts the color filter substrate such that an included angle θ formed therebetween is in a range from 30 degrees to 90 degrees. For example, the angle may be 40 degrees, 60 degrees, 80 degrees or the like. Preferably, the side of the transparent substrate may be perpendicular to a direction of an optical axis of the replaced upper polarizer film.

Figure 14:
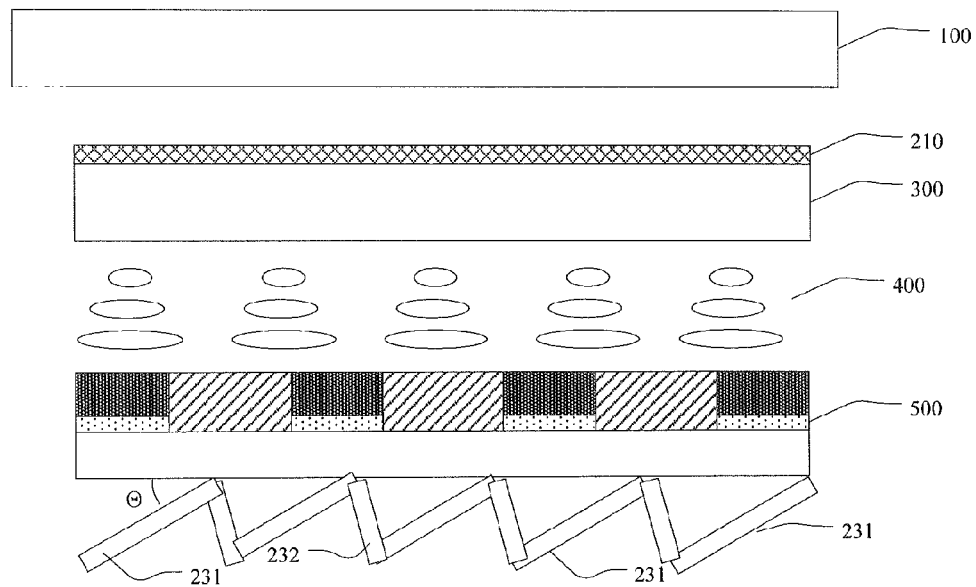
FIG. 14 is an illustrative structural drawing showing a display device according to a further embodiment of the present invention.

In the embodiment of the invention, there may be one transparent substrate. However, since the included angle exists between the transparent substrate 231 and the color filter substrate 500, a plurality of transparent substrates may be provided and the plurality of transparent substrates are disposed in parallel with each other on the color filter substrate 500, so as to reduce an adverse influence on a thickness of the display device due to the included angle, as shown in FIG. 14. Specifically, the transparent substrates 230 may be supported on the color filter substrate by supporting structures 232. To reduce bad influence on transmittance of a display panel caused by the supporting structures 232, the supporting structures may be formed perpendicularly on the color filter substrate.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A color filter substrate, comprising:
an underlying substrate;
a semi-transparent and semi-reflecting layer formed on the underlying substrate; and
a black matrix and a color filter layer formed on the semi-transparent and semi-reflecting layer,
wherein the black matrix and the color filter layer are formed on a side of the semi-transparent and semi-reflecting layer away from the underlying substrate;
wherein the semi-transparent and semi-reflecting layer comprises a first region on which the black matrix is formed and a second region on which the color filter layer is formed, and a light reflectivity of the first region is larger than a light reflectivity of the second region;
wherein the semi-transparent and semi-reflecting layer comprises a reflective film;
wherein a light reflectivity of the reflective film decreases as a thickness thereof decreases, and a light transmittance of the reflective film increases as a thickness thereof decreases; and
wherein a thickness of a portion of the reflective film located in the first region is larger than a thickness of a portion of the reflective film located in the second region.

2. The color filter substrate according to claim 1, wherein the thickness of the portion of the reflective film in the first region is in a range from 500 Å to 4000 Å, and the thickness of the portion of the reflective film located in the second region is in a range from 0 Å to 2000 Å.

3. The color filter substrate according to claim 1, wherein the second region of the semi-transparent and semi-reflecting layer is formed with a perforated structure.

4. A method for manufacturing a color filter substrate, comprising steps of:
  forming a semi-transparent and semi-reflecting layer on an underlying substrate; and
  forming a black matrix and a color filter layer successively on a side of the semi-transparent and semi-reflecting layer away from the underlying substrate,
  wherein the step of forming the semi-transparent and semi-reflecting layer on the underlying substrate comprises forming a reflective film on the underlying substrate;
  wherein a light reflectivity of the reflective film decreases as a thickness thereof decreases and a light transmittance of the reflective film increases as a thickness thereof decreases; and
  wherein the method further comprises etching the reflective film to form a first region having a larger thickness and a second region having a smaller thickness after the black matrix is formed on the reflective film.

5. The method according to claim 4, wherein the color filter layer is formed on the second region of the reflective film.

6. The method according to claim 4, wherein the thickness of the first region is in a range from 500 Å to 4000 Å and the thickness of the second region is in a range from 0 Å to 2000 Å.

7. The method according to claim 4, further comprising:
  after etching the reflective film and before forming the color filter layer, forming a perforated structure in the second region.

8. A display device, comprising a backlight module, a polarizer structure, an array substrate, a liquid crystal layer, and a color filter substrate, wherein the color filter substrate comprises:
  an underlying substrate;
  a semi-transparent and semi-reflecting layer formed on the underlying substrate; and
  a black matrix and a color filter layer formed on the semi-transparent and semi-reflecting layer, the black matrix and the color filter layer being formed on a side of the semi-transparent and semi-reflecting layer away from the underlying substrate;
  wherein the semi-transparent and semi-reflecting layer comprises a first region on which the black matrix is formed and a second region on which the color filter layer is formed, and a light reflectivity of the first region is larger than a light reflectivity of the second region;
  wherein the semi-transparent and semi-reflecting layer comprises a reflective film;
  wherein a light reflectivity of the reflective film decreases as a thickness thereof decreases, and a light transmittance of the reflective film increases as a thickness thereof decreases; and
  wherein a thickness of a portion of the reflective film located in the first region is larger than a thickness of a portion of the reflective film located in the second region.

9. The display device according to claim 8, wherein the thickness of the portion of the reflective film in the first region is in a range from 500 Å to 4000 Å, and the thickness of the portion of the reflective film located in the second region is in a range from 0 Å to 2000 Å.

10. The display device according to claim 8, wherein the second region of the semi-transparent and semi-reflecting layer is formed with a perforated structure.

11. A display device, comprising a backlight module, a polarizer structure, an array substrate, a liquid crystal layer, and a color filter substrate, wherein the color filter substrate comprises:
  an underlying substrate;
  a semi-transparent and semi-reflecting layer formed on the underlying substrate; and
  a black matrix and a color filter layer formed on the semi-transparent and semi-reflecting layer, the black matrix and the color filter layer being formed on a side of the semi-transparent and semi-reflecting layer opposite from the underlying substrate,
  wherein the polarizer structure comprises a lower polarizer film located between the backlight module and the array substrate, and at least one transparent substrate located on a side of the color filter substrate away from the liquid crystal layer, and
  wherein an angle formed between the transparent substrate and the color filter substrate is in a range from 30 degrees to 90 degrees.

12. The display device according to claim 11, wherein the at least one transparent substrate comprises a plurality of transparent substrates disposed in parallel with each other on the color filter substrate.

* * * * *